(12) United States Patent
Raghavan et al.

(10) Patent No.: US 9,195,711 B2
(45) Date of Patent: Nov. 24, 2015

(54) PERSISTING AND RETRIEVING ARBITRARY SLICES OF NESTED STRUCTURES USING A COLUMN-ORIENTED DATA STORE

(71) Applicant: International Business Machines Corporation, Armonk, NY (US)

(72) Inventors: Sriram Raghavan, Bangalore (IN); Narendran Sachindran, Bangalore (IN); Manish Sethi, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 13/792,930

(22) Filed: Mar. 11, 2013

(65) Prior Publication Data

US 2014/0258265 A1  Sep. 11, 2014

(51) Int. Cl.
*G06F 17/30* (2006.01)

(52) U.S. Cl.
CPC .... *G06F 17/30442* (2013.01); *G06F 17/30463* (2013.01)

(58) Field of Classification Search
None
See application file for complete search history.

(56) References Cited

U.S. PATENT DOCUMENTS

| 6,564,203 | B1 | 5/2003 | Krishnaprasad et al. | |
| 7,464,247 | B2 | 12/2008 | Uppala | |
| 2003/0163285 | A1* | 8/2003 | Nakamura et al. | 702/179 |
| 2008/0120322 | A1* | 5/2008 | Liu et al. | 707/102 |
| 2009/0307186 | A1* | 12/2009 | Hoshino et al. | 707/2 |
| 2010/0088315 | A1 | 4/2010 | Netz et al. | |
| 2011/0055661 | A1 | 3/2011 | Grube et al. | |
| 2011/0289118 | A1* | 11/2011 | Chen et al. | 707/803 |
| 2011/0302226 | A1 | 12/2011 | Abadi et al. | |

FOREIGN PATENT DOCUMENTS

WO  WO 2012072364 A1  6/2012

OTHER PUBLICATIONS

Cudre-Mauroux, Philippe et al., "The Case for RodentStore, an Adaptive, Declarative Storage System," 4th Biennial Conference on Innovative Data Systems Research (CIDR), Asilomar, California, USA, Jan. 4-7, 2009, 7 pages.

* cited by examiner

*Primary Examiner* — Anh Tai Tran
(74) *Attorney, Agent, or Firm* — Ference & Associates LLC (57) ABSTRACT

Methods and arrangements for storing and retrieving nested structures. A nested structure is obtained. There are created slices containing arbitrary sub-structures of the nested structure. The content of slices is stored in one or more columns of a column-oriented data store. At least one access plan for accessing slices in the data store is developed, to be used when a projection query is received. The access plan is executed to construct a nested structure that answers the projection query. Other variants and embodiments are broadly contemplated herein.

17 Claims, 10 Drawing Sheets

```
Expression := ExpressionComponent | Expression ExpressionComponent
ExpressionComponent := Inclusion | Inclusion Exclusion
Exclusion := - JSONPath
Inclusion := + JSONPath
JSONPath := JSONPathToSelf | NestedFieldName
NestedFieldName := JSONFieldName | NestedFieldName PathSeparator JSONFieldName
PathSeparator := .
JSONPathToSelf := .
JSONFieldName := ValidJavaString
ValidJavaString is any string literal in java excluding '.'
```

PERSISTING AND RETRIEVING ARBITRARY SLICES OF NESTED STRUCTURES USING A COLUMN-ORIENTED DATA STORE

BACKGROUND

Generally, the complexity of nested structures does not always lend itself to the efficient storage and retrieval of such structures. Conventional efforts, to date, have not proven to be as effective or efficient as desired. Particularly, a large body of work has been developed to show how nested XML (extensible markup language) structures can be mapped to relational storage. However, conventional efforts have fallen short in being able to provide a more flexible mapping of nested structures to storage, e.g., to column-oriented storage. Potential advantages of such flexible mapping have thus been missed.

BRIEF SUMMARY

In summary, one aspect of the invention provides a method of storing and retrieving nested structures with respect to a column oriented data store, said method comprising: utilizing a processor to execute computer code configured to perform the steps of: obtaining a nested structure; creating slices containing arbitrary sub-structures of the nested structure; storing the content of the slices in one or more columns of a column-oriented data store; developing at least one access plan for accessing the slices in the data store, to be used when a projection query is received; and executing the access plan to construct a nested structure that answers the projection query.

Another aspect of the invention provides an apparatus for storing and retrieving nested structures with respect to a column oriented data store, said apparatus comprising: at least one processor; and a computer readable storage medium having computer readable program code embodied therewith and executable by the at least one processor, the computer readable program code comprising: computer readable program code configured to obtain a nested structure; computer readable program code configured to create slices containing arbitrary sub-structures of the nested structure; computer readable program code configured to store the content of the slices in one or more columns of a column-oriented data store; computer readable program code configured to develop at least one access plan for accessing the slices in the data store, to be used when a projection query is received; and computer readable program code configured to execute the access plan to construct a nested structure that answers the projection query.

An additional aspect of the invention provides a computer program product for storing and retrieving nested structures with respect to a column oriented data store, said computer program product comprising: a computer readable storage medium having computer readable program code embodied therewith, the computer readable program code comprising: computer readable program code configured to obtain a nested structure; computer readable program code configured to create slices containing arbitrary sub-structures of the nested structure; computer readable program code configured to store the content of the slices in one or more columns of a column-oriented data store; computer readable program code configured to develop at least one access plan for accessing the slices in the data store, to be used when a projection query is received; and computer readable program code configured to execute the access plan to construct a nested structure that answers the projection query.

A further aspect of the invention provides a method comprising: inputting a nested structure; providing a collocation specification comprising: expressions which define slices of the nested structure, the slices comprising subsets of fields within the nested structure; and a grouping of one or more of the slices for collocation at a storage layer; computing an expression which defines a subset of fields not covered in the collocation specification; preparing, in a data store, structures for storing at least portions of the nested structure; creating slices from the nested structure; storing the created slices in the data store; enumerating at least one access plan, each access plan comprising at least one slice which is configured for retrieving an arbitrary query slice from the data store; estimating a cost of each access plan; choosing an access plan, from the at least one access plan, based on the estimating of cost; and executing the chosen access plan, and reconstructing the nested structure from one or more slices retrieved by the chosen access plan, wherein the reconstructed nested structure comprises at least one field encompassed by the query slice associated with the chosen access plan.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIGS. 1b-1d schematically illustrate sub-processes associated with the system architecture of FIG. 1a.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 6. In accordance with an example embodiment, most if not all of the process steps, components and outputs discussed with respect to FIGS. 1-5 can be performed or utilized by way of a processing unit or units and system memory such as those indicated, respectively, at 16' and 28' in FIG. 6, whether on a server computer, a client computer, a node computer in a distributed network, or any combination thereof.

Generally, there is broadly contemplated herein, in accordance with at least one embodiment of the invention, a system and method for persistence and retrieval of nested structures using a column-oriented data store that includes a flexible specification for collocation of object slices. This specification is consumed in order to preparing an underlying data store, creating slices of an input object and storing them into the data store, and enumerating access plans which include slices, and their projections, that can answer a projection query.

Generally, there are also broadly contemplated herein, in accordance with at least one embodiment of the invention, a method for computing residual slices of a nested structure, a method for enumerating access plans for retrieving slices and their projections in order to answer a projection query, and a method for estimating cost of an access plan for retrieval.

Generally, it can be noted that information is often represented as nested structures (e.g., XML documents or objects in programming languages). This has become de-facto in many scenarios such as application development and information exchange. However, relational models are still widely used for persisting information. This has led to considerable work in the area of mapping nested structures into a relational data store.

Existing solutions in this area can generally be grouped into categories of "schema-oblivious" and "schema-aware". Schema-oblivious techniques store both structural information and field values into relational tables but do not provide the flexibility of mapping fields of nested structures to arbitrary columns of a table. Schema-aware solutions create one or more relational tables specific to the schema of the nested structure and store only field values in relevant columns. Some of these schema-aware solutions also allow mapping of fields to the columns of existing tables in a relational store.

As such, by way of further background, a conventional arrangement for the physical storage of structured data involves column-oriented techniques. As such, column-oriented stores have been used to represent relational data and optimize the performance of typical data warehouse analytic workloads. Furthermore, the techniques involved have also been used to physically represent non-relational key-value data in systems such as HBase™ (an open source, non-relational, distributed database from the Apache Software Foundation of Forest Hill, Md., written in Java™ and constituting a portion of the Apache Hadoop project) and Cassandra™ (another open source distribut ed database management system the Apache Software Foundation, configured to handle very large amounts of data spread out across many commodity servers).

However, despite the best intentions associated conventional schema-obvious and schema-aware efforts alike, no conventional solutions are known to permit a flexible mapping of arbitrary fields within nested structures to a column-oriented relational or key-value store.

As such, there are broadly contemplated herein, in accordance with at least one embodiment of the invention, systems and methods for mapping from nested structures to a column-oriented data store. Thereby provided is a considerable degree of flexibility to group multiple arbitrary fields (referred to herein as "slices") from the nested structure, and map them onto a single column in an underlying column-oriented data store. Further, complete schema knowledge about the nested structure is not thereby required.

In accordance with at least one embodiment of the invention, users are able to specify expressions that define slices within a nested structure. Slices, as such, can possibly be overlapping, wherein fields are intended to be collocated in the underlying column store if and only if they belong to one slice. Also, the union of fields mentioned in various slices need not cover all the fields that can possibly be present in the nested structure.

In accordance with at least one embodiment of the invention, an additional slice expression, referred to as a "residual slice" is computed, and contains the set of fields that has not been covered by any of the expressions given by the user. The structures in the underlying column store are prepared based on the set of slice expressions given by the user and provided by the residual slices. While persisting a nested structure, different slices (one per expression) are prepared, and each slice is persisted into the designated column in the column store.

In accordance with at least one embodiment of the invention, queries serve to retrieve an arbitrary set of fields, themselves represented as a slice expression, and may be independent of the expressions used to prepare/write to the column store. All possible access plans are computed, wherein an access plan includes a set of slices that would suffice in order to prepare the nested structure that contains only those fields that are requested by the query. A mechanism is provided to evaluate the cost of each access plan based on given metrics such as overall volume of data stored in the columns that need to be retrieved.

In accordance with at least one embodiment of the invention, the system executes an access plan and reconstructs the nested structure from the slices retrieved by the access plan. The resultant nested structure contains only fields that are requested by the query.

In accordance with at least one embodiment of the invention, as discussed herein, a slice is an arbitrary projection of a nested structure to be persisted in a single column of a column store. A slice expression is an expression applied to a nested structure that results in a slice, and includes a sequence of sub-expressions evaluated from left to right. A sub-expression, for its part, denotes a path within the nested structure and indicates either an inclusion (+) or an exclusion (−). An inclusion specifies a path in the nested structure which is to be added to the slice, while an exclusion specifies a path in the nested structure which is to be removed from the slice constructed from the preceding sub-expressions. The expression ".", as employed herein, denotes the whole of a nested structure.

In accordance with at least one embodiment of the invention, as discussed herein, a slice family spec is a set of slice expressions corresponding to slices that need to be collocated during persistence. A layout spec is a collection of slice families for a nested structure. Additionally, a residual slice expression is a derived slice expression which represents the slice of an object not included in a layout spec. A layout is constituted of a layout spec plus a residual slice expression, while a projection query is a slice expression used to express a query.

As will be appreciated more fully from detailed description herebelow, there are broadly contemplated herein, in accordance with at least one embodiment of the invention, methods and arrangements for specifying how arbitrary groups of attributes within a nested structure can be mapped to column-oriented storage. Additionally, this can be achieved even with partial knowledge of the schema for the nested structure. Also broadly contemplated herein are methods and arrangements for storing nested structures in a column-oriented database, given the above specification. Further, there are broadly contemplated herein methods and arrangements for efficiently retrieving desired attributes from a column-oriented database.

Figure 1A:
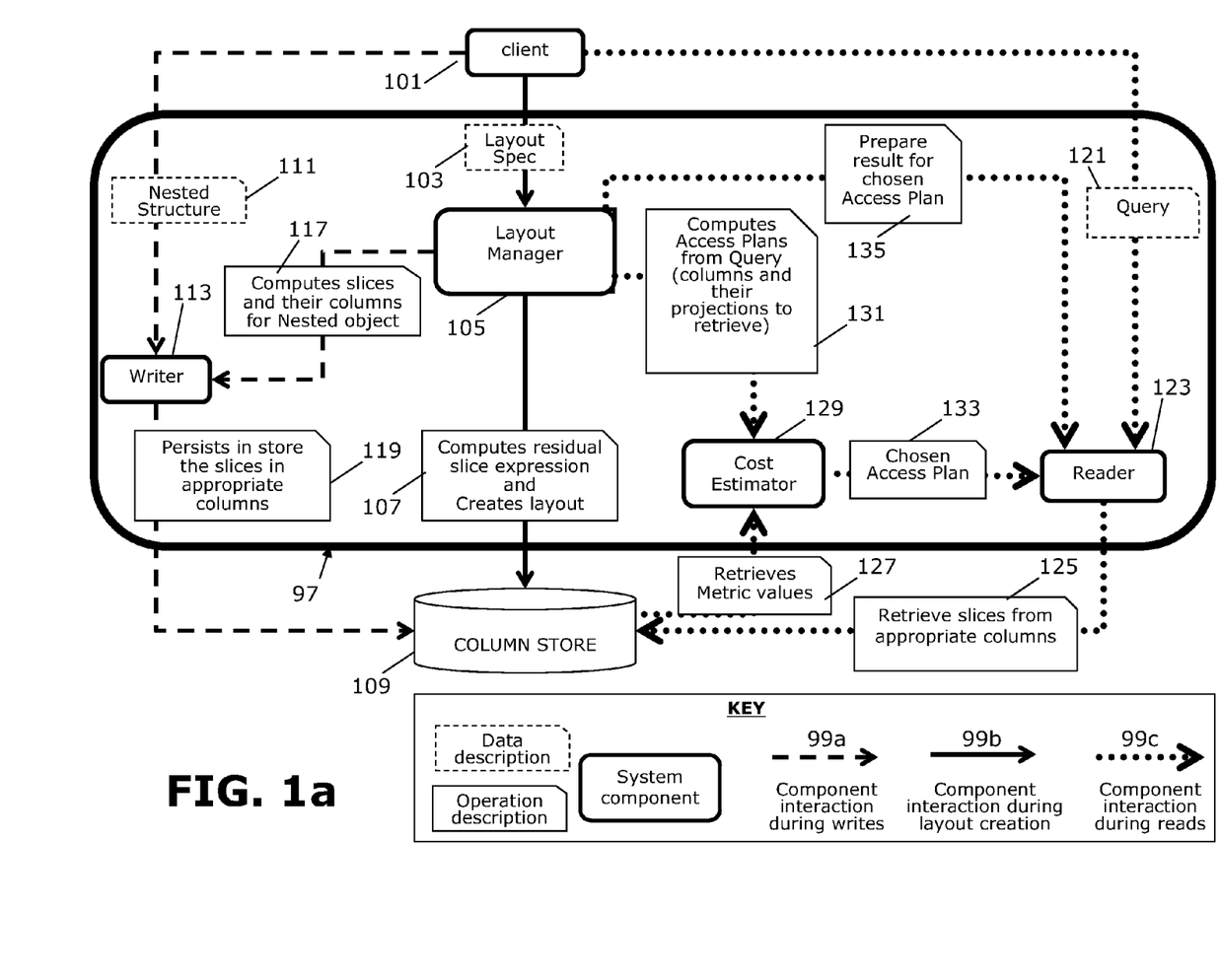
FIG. 1a schematically illustrates a system architecture.
Figure 1B:
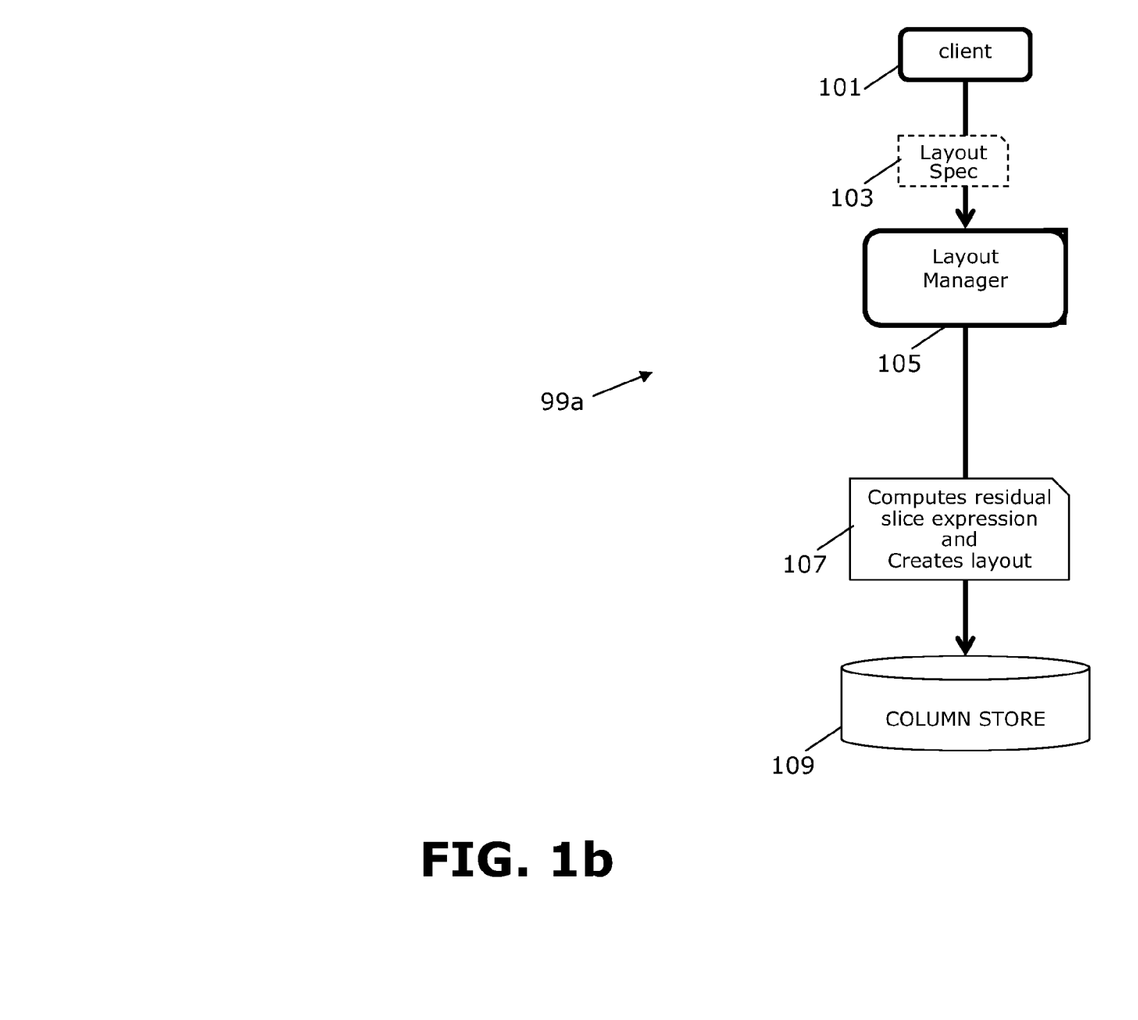
Figure 1C:
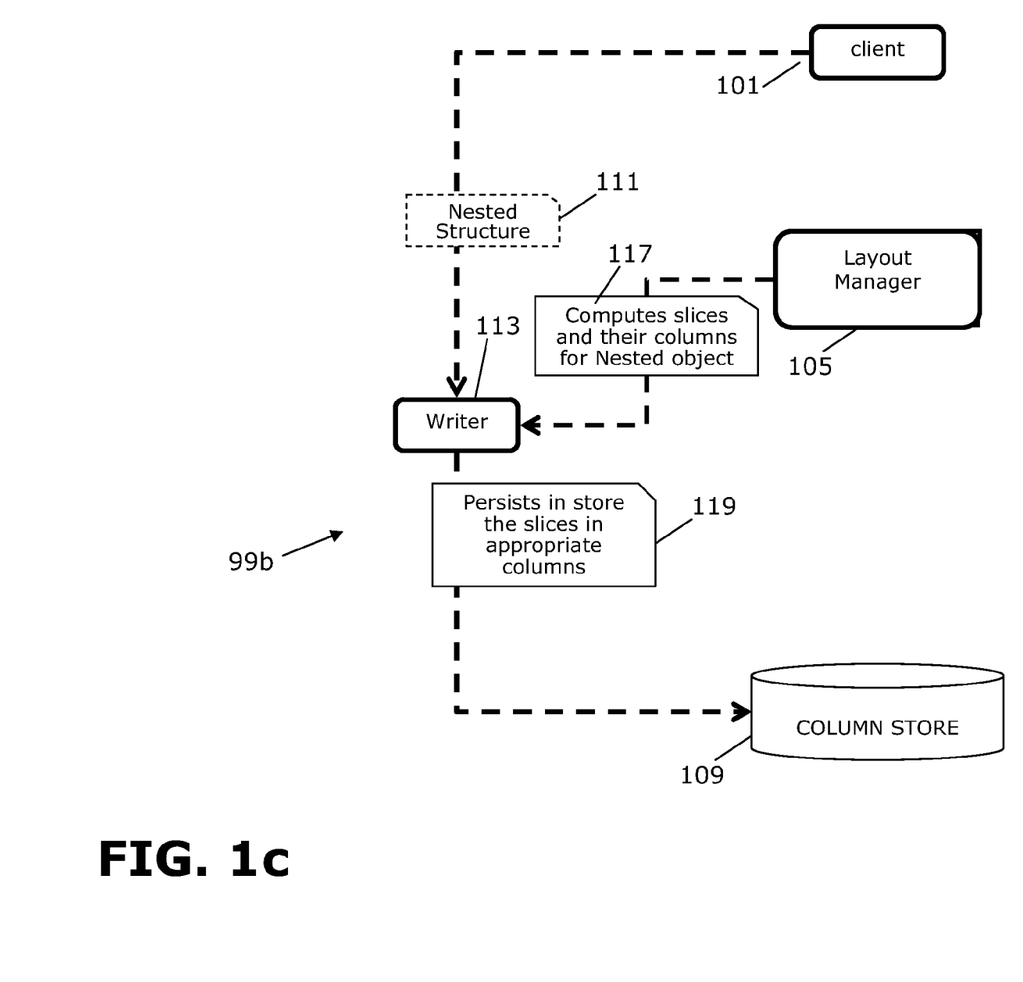
Figure 1D:
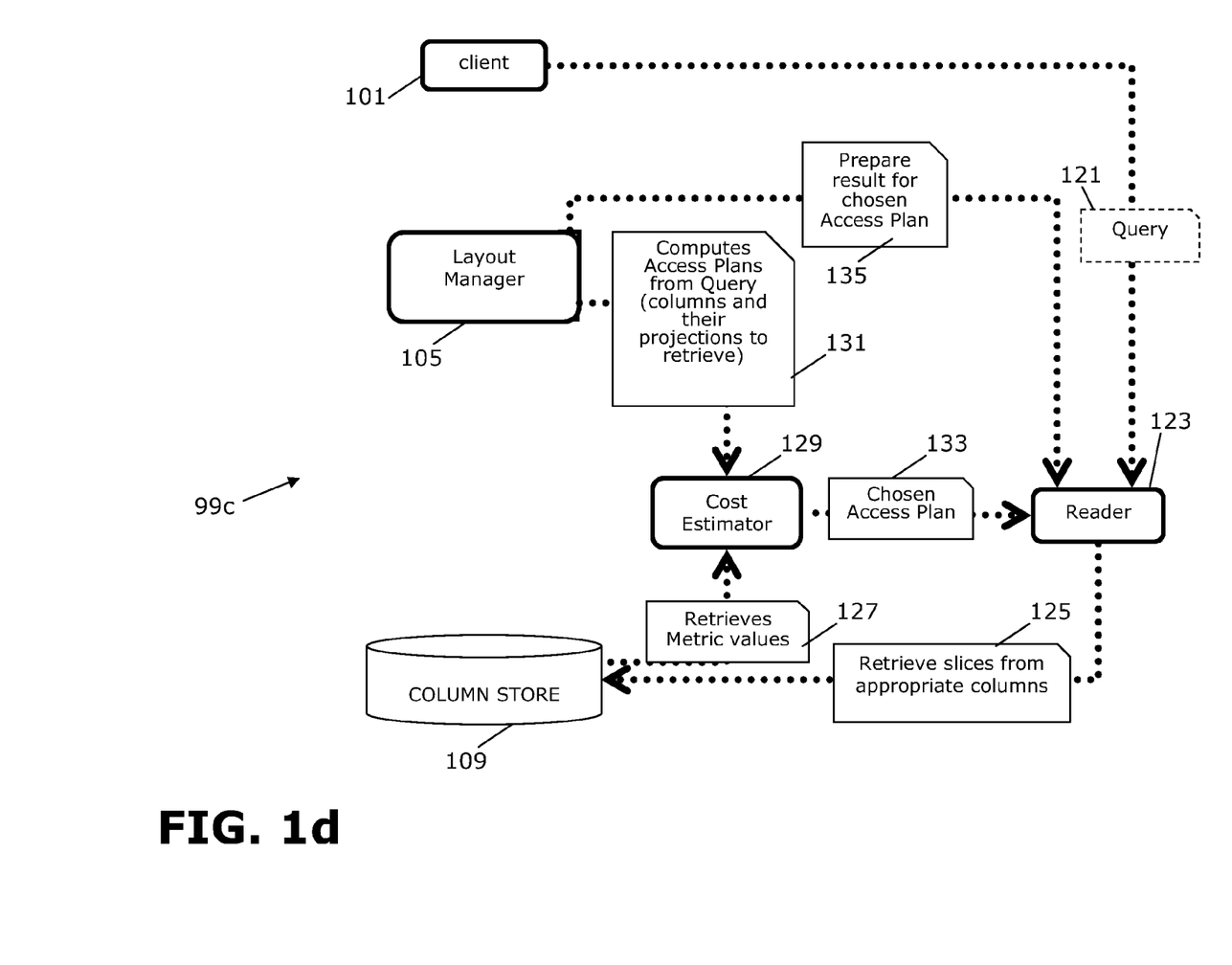

FIG. 1a schematically illustrates a system (97) architecture, in accordance with at least one embodiment of the invention. Three constituent processes involving system 97 are thereby shown: component interaction during writes (99a; dotted process arrows); component interaction during layout creation (99b; solid process arrows); and component interaction during reads (99c; dotted process arrows). The flow of these constituent processes will be better appreciated and understood from the discussion herebelow, as well as from the FIGS. 1b-1d that depict each process in isolation. (Reference can continue to be made to FIG. 1a throughout the discussion herebelow.)

Essentially, in accordance with at least one embodiment of the invention, in persisting nested structures, layouts are mapped to a column-oriented store. Each layout is mapped to a table, and each slice family spec in the layout is mapped to a column family. Each slice expression is mapped to a column in the column family of the enclosing slice family spec. The residual slice expression is mapped to an implicit column in a implicit column family. In persisting the nested structures into a column-oriented store, for each slice expression, a slice is constructed. The slices are then serialized to the corresponding columns.

More particularly, in accordance with at least one embodiment of the invention as shown in FIG. 1a, layout creation involves, from the client end (101), creating a layout spec 103, providing this to the layout manager 105, followed by a computation of a residual slice expression and creation of a layout (107), followed then by persistence (or storage) into a column store 109. This sub-process is also shown in isolation in FIG. 1b.

In accordance with at least one embodiment of the invention, during writes to the column store 109, a nested structure 111 is provided to a writer 113 from the client 101, while— from the layout manager 105—slices and their columns are computed (117) with respect to the nested structure. Slices are then persisted into the store with respect to the appropriate columns (119). This sub-process is also shown in isolation in FIG. 1c.

In accordance with at least one embodiment of the invention, in undertaking reads, first from the client end (101) a query 121 is made of a reader 123 for a read. The reader 123 then acts to retrieve slices from appropriate columns (125) and, from the column store 109, metric values are retrieved (127) and fed to a cost estimator 129. (Metric values constitute values that are measured from experiments on sample data or workloads; e.g., a metric could be "deserialization cost" and the measured cost would be the metric value.) From the layout manager 105, access plans are computed from the query, wherein an access plan includes columns, and their projections thereof, to be retrieved (131); the access plans are also sent to the cost estimator 129. The cost estimator chooses an access plan (in a manner to be more fully appreciated herebelow) (133) and the layout manager prepares a result (query answer) for the chosen access plan (135). This sub-process is also shown in isolation in FIG. 1d.

Figure 2:
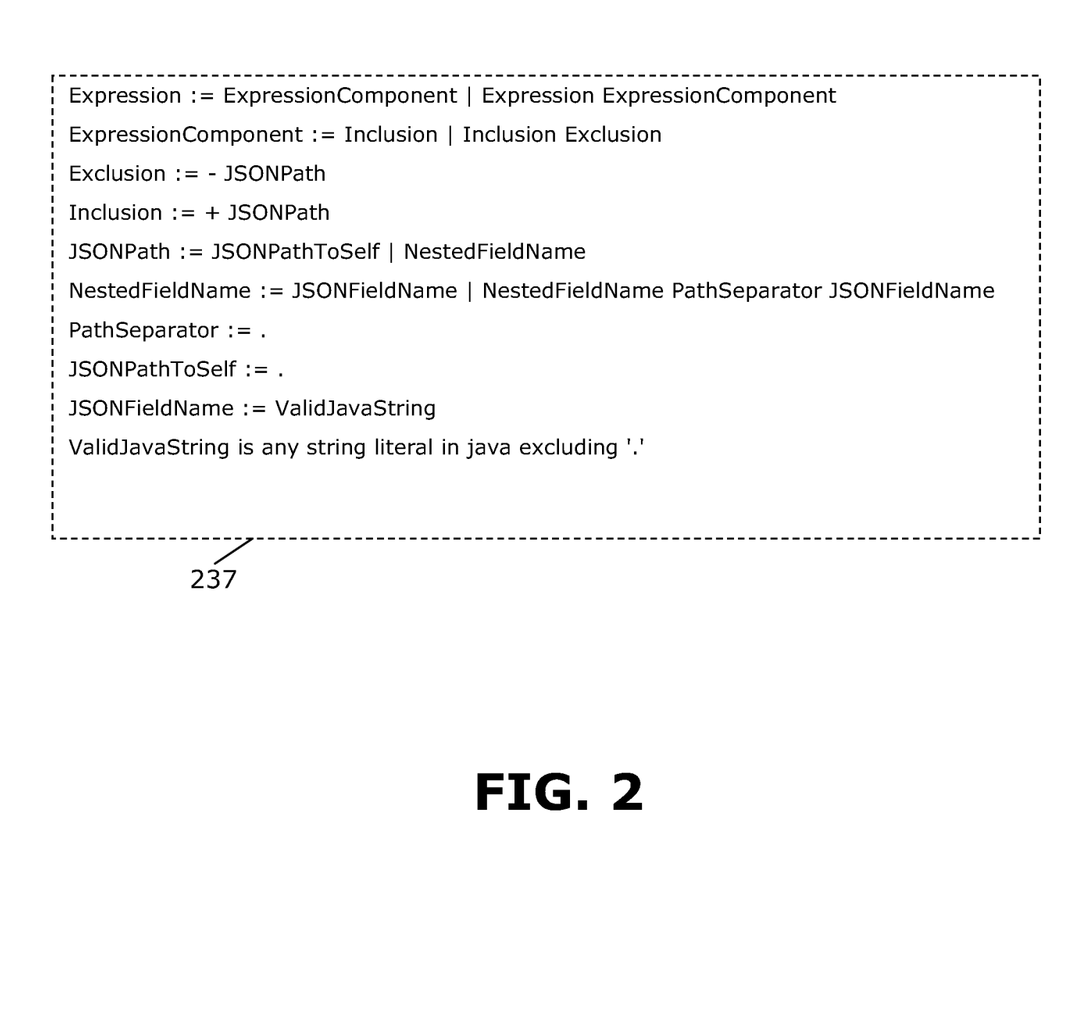
FIG. 2 depicts a BNF (Backus-Naur Form) grammar for a slice expression.
Figure 3:
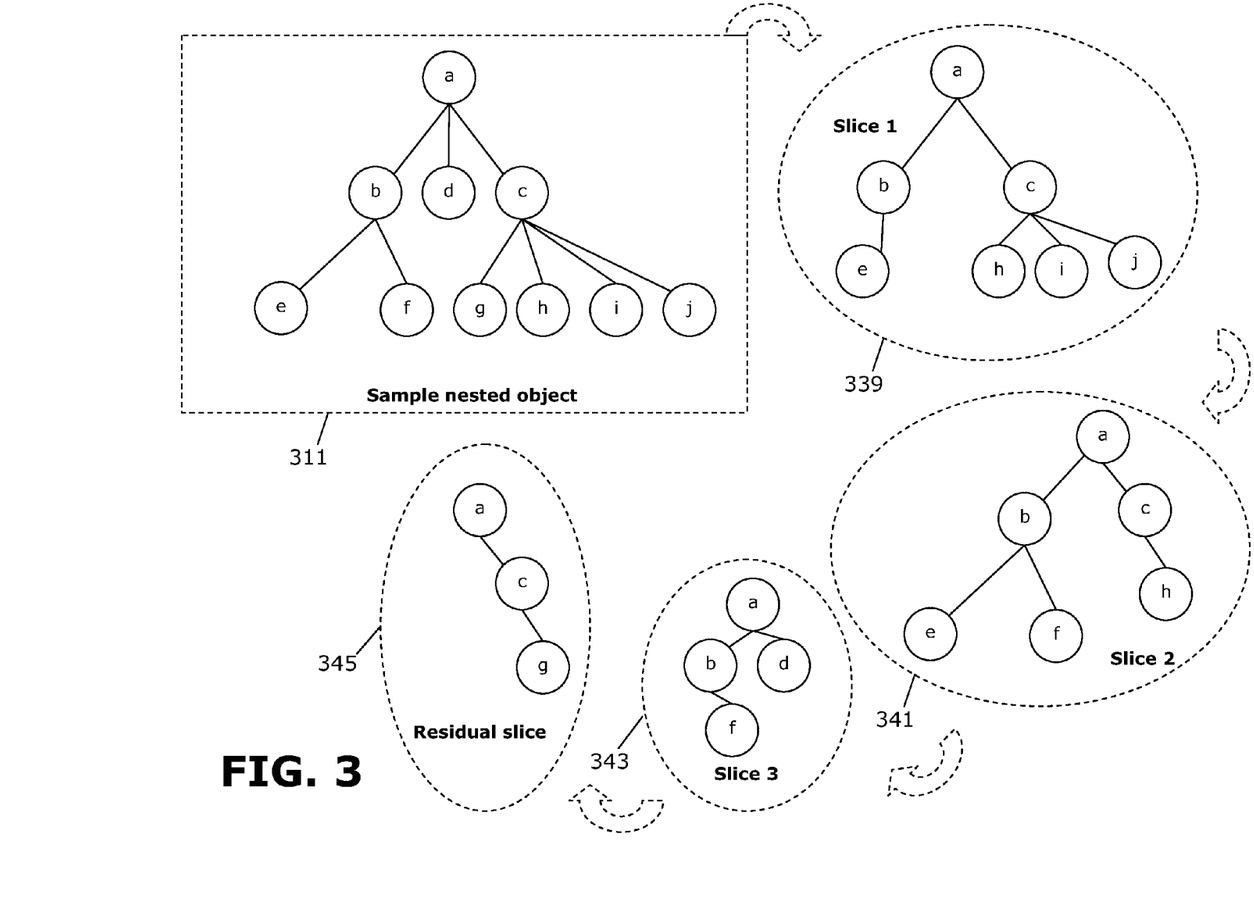
FIG. 3 schematically illustrates a sample nested structure and associated slices.

FIG. 2 sets forth a BNF (Backus-Naur Form) grammar 237 for a slice expression, in accordance with at least one embodiment of the invention FIG. 3 schematically illustrates a sample nested structure 311 and associated slices, in accordance with at least one embodiment of the invention, and its yielding of first, second and third slice expressions (339, 341 and 343 respectively) as well as a residual slice 345. On the basis of the example of FIG. 3, the following can be noted:

Slice expression1 (339)=.−a.b.f−a.d−a.c.g
Slice expression2 (341)=a.c.h+a.b
Slice expression3 (343)=a.b.f+a.d
Slice Family Spec1={Slice expression1}
Slice Family Spec2={Slice expression2, Slice expression3}
Layout Spec=[Slice Family Spec1, Slice Family Spec2]
Residual Slice expression (345)=a.c.g
Layout=[Slice Family Spec1, Slice Family Spec2, Residual Slice expression]

Figure 4:
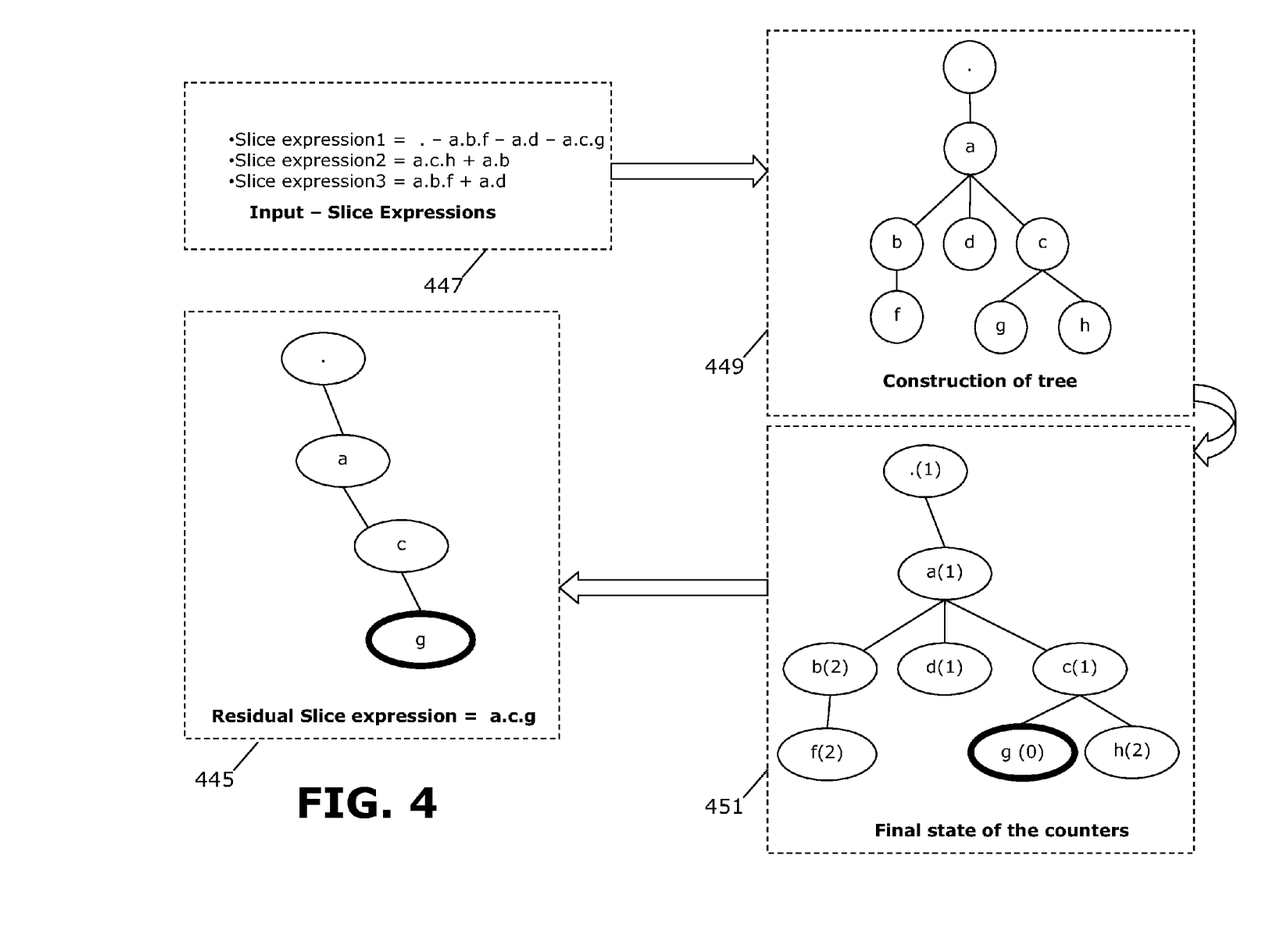
FIG. 4 schematically illustrates an example of computing a residual slice expression.

FIG. 4 schematically illustrates an example of computing a residual slice expression 445, in accordance with at least one embodiment of the invention. Generally, as shown, upon the input of slice expressions 447, a tree is constructed (449). A final state of counters is then determined (451), and a residual slice expression 445 is produced.

Accordingly, in accordance with at least one embodiment of the invention, and with continued reference to FIG. 4, access plans can be enumerated as follows for serving a projection query. Generally, an access plan includes one or more slices that need to be retrieved, and a projection thereon. A tree is constructed (449). In addition to the paths specified in the layout expressions, there are included the paths specified in the query expression. As shown in step 451, node counters are decorated for query expression. To this end, there are taken all the nodes with +counter>−counter, referred to as paths-to-retrieve, and for each path-to-retrieve there is maintained a set of slice-ids, referred to as an availability-set.

In accordance with at least one embodiment of the invention, for each slice expression in the layout, the node counters in the tree are reset, the node counters are decorated and, for all paths-to-retrieve, if +counter>−counter, the corresponding slice-id is added to the corresponding availability-set. Then, combinations are computed such that a combination contains one slice-id from each availability-set. Slice-ids are tagged with the path-to-retrieve during combination computation. In a combination, if a slice-id occurs more than once, all are replaced by one slice-id, and paths-to-retrieve for all slice-ids are merged. There are eliminated combinations that are a superset of any other combination and, for each slice-id, those tagged (e.g., the merged path-to-retrieve) are converted into an expression to be evaluated on the slice with corresponding slice-id. One final combination is then referred to as a resultant access plan.

Figure 5:
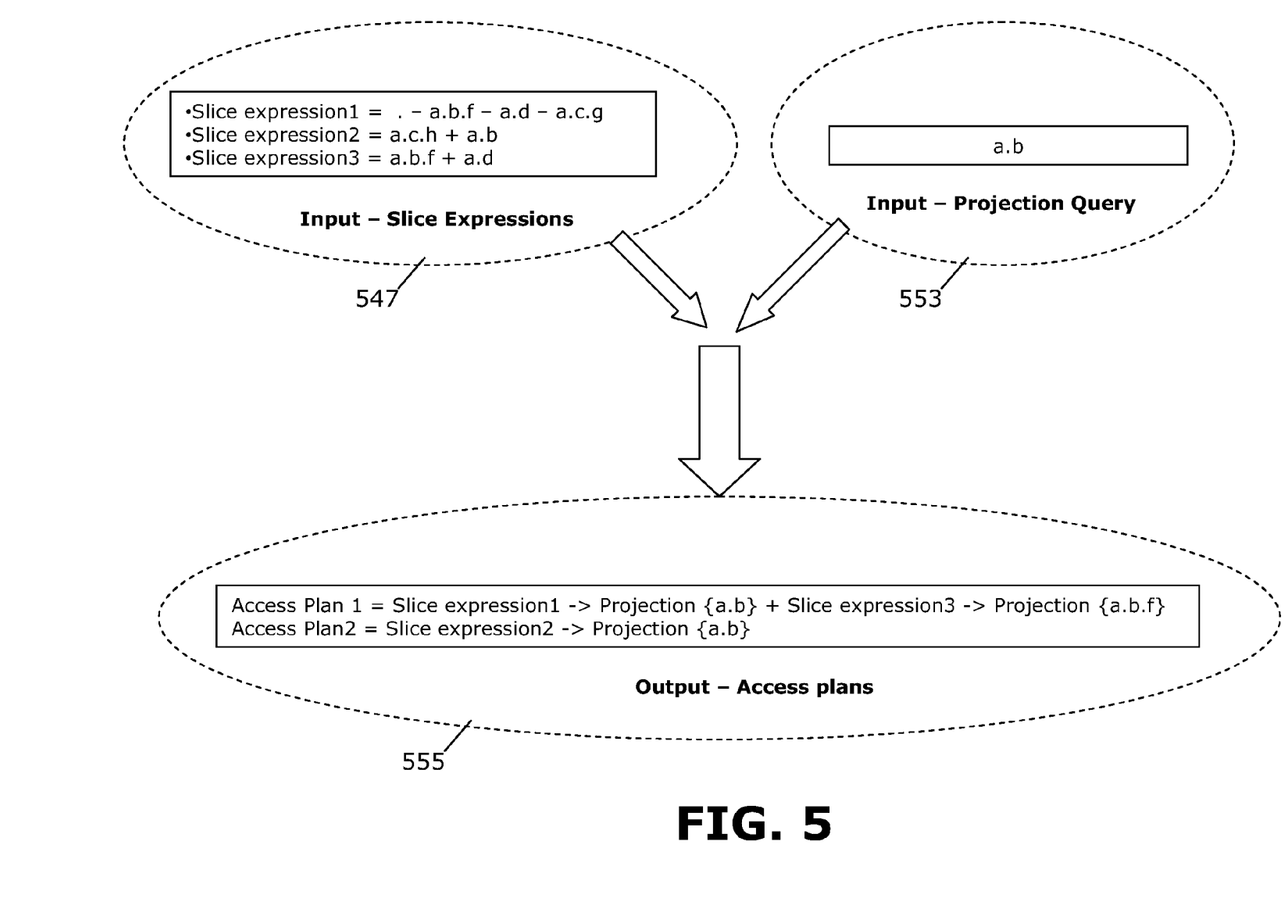
FIG. 5 depicts an example of enumerating access plans.

FIG. 5 depicts an example of enumerating access plans, in accordance with at least one embodiment of the invention. As shown, given inputs of slice expressions 547 and a projection query 553, two access plans (555) result as shown. At this point, cost estimates are rendered for each access plan in order that one may be chosen.

In estimating the cost of an access plan, in accordance with at least one embodiment of the invention, at a core, the cost of an access plan, given an input query and layout spec, is a combination of IO cost (C(IO)), de-serialization cost (C(DS)) and reconstruction cost (C(RC)). C(IO) is the number of bits read from disk, estimated by total volume of the data in the column(s). C(DS) is the cost to de-serialize the nested structures to pull out the pieces required for the query, tying into the structure of the slice(s) in the column(s). C(RC) is the cost to reconstruct the final object, tying into the total number of columns present in the access plan. As such, the total cost of an access plan (C(AP)) can be estimated as a linear combination of the above costs, wherein:

$$C(AP) = \alpha * C(IO) + \beta * C(DS) + \gamma * C(RC)$$

Figure 6:
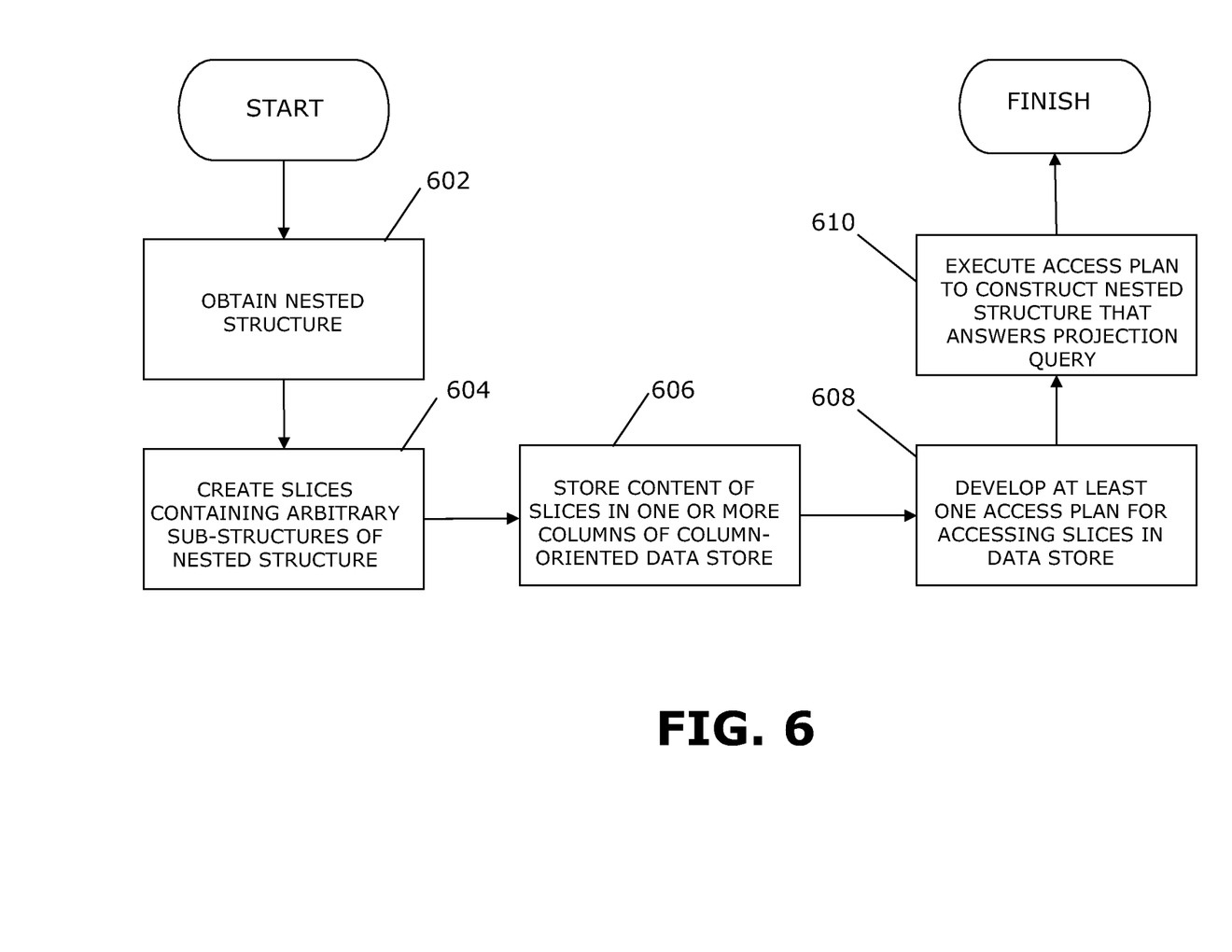
FIG. 6 sets forth a process more generally for storing and retrieving nested structures.

FIG. 6 sets forth a process more generally for storing and retrieving nested structures, in accordance with at least one embodiment of the invention. It should be appreciated that a process such as that broadly illustrated in FIG. 6 can be carried out on essentially any suitable computer system or set of computer systems, which may, by way of an illustrative and non-restrictive example, include a system such as that indicated at 12' in FIG. 7. In accordance with an example embodiment, most if not all of the process steps discussed with respect to FIG. 6 can be performed by way of a processing unit or units and system memory such as those indicated, respectively, at 16' and 28' in FIG. 7.

As shown in FIG. 6, in accordance with at least one embodiment of the invention, a nested structure is obtained (602). There are created slices containing arbitrary sub-structures of the nested structure (604). The content of slices is stored in one or more columns of a column-oriented data store (606). At least one access plan for accessing slices in the data store is developed, to be used when a projection query is received (608). The access plan is executed to construct a nested structure that answers the projection query (610).

Figure 7:
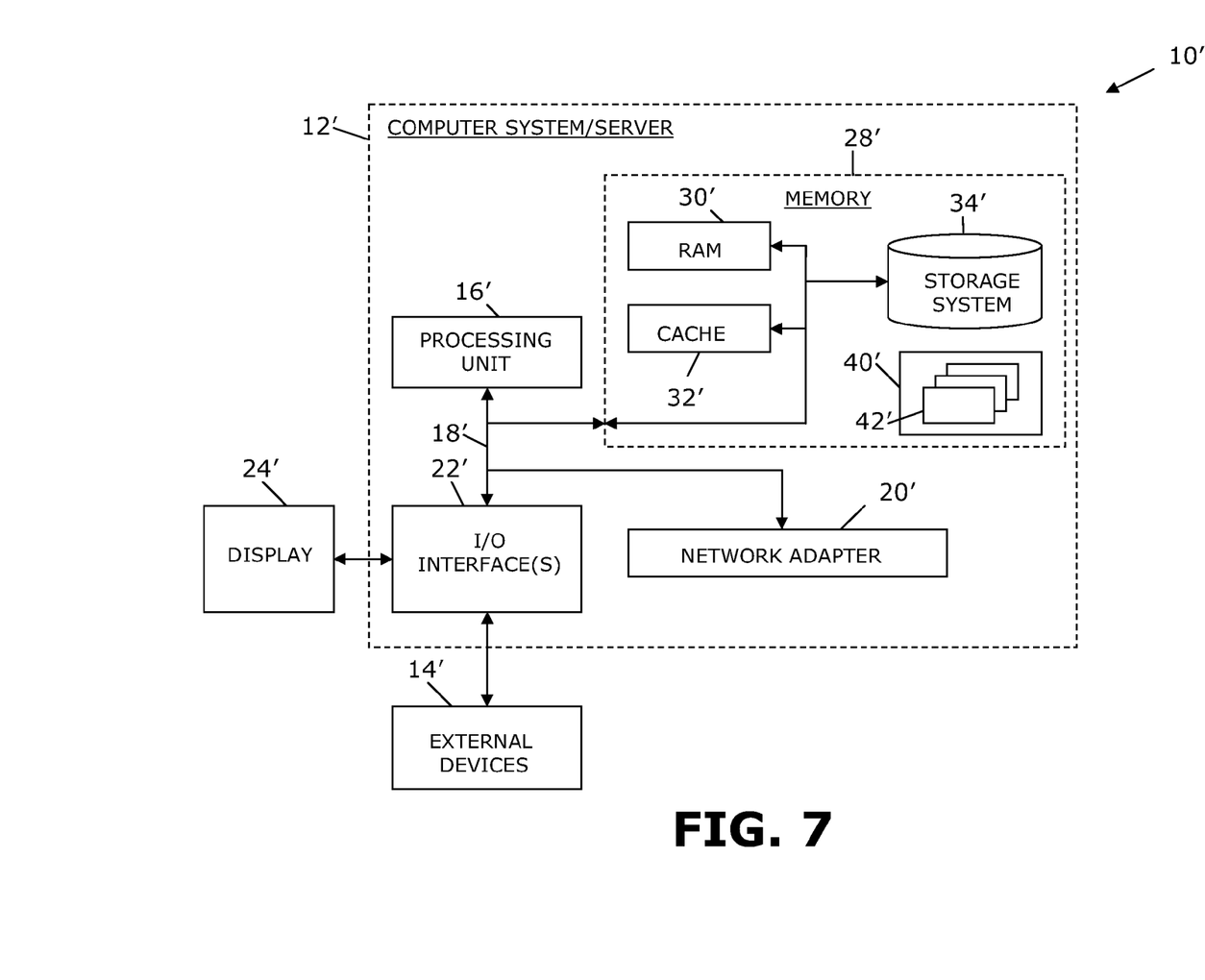
FIG. 7 illustrates a computer system.

Referring now to FIG. 7, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of storing and retrieving nested structures with respect to a column oriented data store, said method comprising:
utilizing a processor to execute computer code configured to perform the steps of:
obtaining a nested structure;
creating slices containing arbitrary sub-structures of the nested structure;
storing the content of the slices in one or more columns of a column-oriented data store;
developing at least one access plan for accessing the slices in the data store, to be used when a projection query is received;
said developing comprising:
defining at least one stored slice to be retrieved for answering the projection query;
said defining comprising:
constructing a tree, wherein the tree comprises paths specified in at least one layout expression and paths specified in the projection query; and
for each path to retrieve, maintaining an availability set comprising a set of slice IDs; and
providing a projection relative to at least one of the retrieved slices;
estimating a cost of the at least one access plan; and
executing the access plan to construct a nested structure that answers the projection query.

2. The method according to claim 1, wherein said creating comprises creating slices derived from a collocation specification.

3. The method according to claim 1, wherein said creating comprises computing a residual slice containing that portion of the nested structure that is not present in any of the created slices.

4. The method according to claim 3, comprising:
defining a layout specification which comprises a collection of slice expressions relative to the nested structure; and
computing a residual slice expression for representing a slice of the nested structure not included in the layout specification.

5. The method according to claim 4, comprising combining information from the slices retrieved by the access plan and the layout specification.

6. The method according to claim 4, wherein the expression comprises a sequence of sub-expressions, each sub-expression denoting a path within the nested structure.

7. The method according to claim 6, wherein each sub-expression indicates at least one of:
an inclusion, which specifies a path in the nested structure which is to be added to the slice; and
an exclusion, which specifies a path in the nested structure which is to be removed from the slice.

8. The method according to claim 7, wherein the exclusion is constructed from preceding sub-expressions in the sequence of sub-expressions.

9. The method according to claim 1, wherein said estimating comprises estimating a total cost as a function of IO cost, de-serialization cost and reconstruction cost.

10. The method according to claim 9, wherein:
the IO cost is the number of bits read from disk;
the deserialization cost is the cost to de-serialize the nested structure; and
the reconstruction cost is the cost to reconstruct the nested structure that answers the projection query.

11. The method according to claim 10, wherein the total cost is a linear combination of IO cost, de-serialization cost and reconstruction cost.

12. An apparatus for storing and retrieving nested structures with respect to a column oriented data store, said apparatus comprising:
at least one processor; and
a computer readable storage medium having computer readable program code embodied therewith and executable by the at least one processor, the computer readable program code comprising:
computer readable program code configured to obtain a nested structure;
computer readable program code configured to create slices containing arbitrary sub-structures of the nested structure;
computer readable program code configured to store the content of the slices in one or more columns of a column-oriented data store;
computer readable program code configured to develop at least one access plan for accessing the slices in the data store, to be used when a projection query is received;
the developing comprising:
defining at least one stored slice to be retrieved for answering the projection query;
the defining comprising:
constructing a tree, wherein the tree comprises paths specified in at least one layout expression and paths specified in the projection query; and
for each path to retrieve, maintaining an availability set comprising a set of slice IDs; and
providing a projection relative to at least one of the retrieved slices;
estimating a cost of the at least one access plan; and
computer readable program code configured to execute the access plan to construct a nested structure that answers the projection query.

13. A computer program product for storing and retrieving nested structures, said computer program product comprising:
a non-transitory computer readable storage medium having computer readable program code embodied therewith, the computer readable program code comprising:
computer readable program code configured to obtain a nested structure;
computer readable program code configured to create slices containing arbitrary sub-structures of the nested structure;
computer readable program code configured to store the content of the slices in one or more columns of a column-oriented data store;

computer readable program code configured to develop at least one access plan for accessing the slices in the data store, to be used when a projection query is received;

the developing comprising:
    defining at least one stored slice to be retrieved for answering the projection query;
    the defining comprising:
        constructing a tree, wherein the tree comprises paths specified in at least one layout expression and paths specified in the projection query; and
        for each path to retrieve, maintaining an availability set comprising a set of slice IDs; and
    providing a projection relative to at least one of the retrieved slices;
    estimating a cost of the at least one access plan; and
computer readable program code configured to execute the access plan to construct a nested structure that answers the projection query.

14. The computer program product according to claim 13, wherein said computer readable program code is configured to create slices derived from a collocation specification.

15. The computer program product according to claim 13, wherein said computer readable program code is configured to compute a residual slice containing that portion of the nested structure that is not present in any of the created slices.

16. The computer program product according to claim 15, wherein said computer readable program code is configured to:
    define a layout specification which comprises a collection of slice expressions relative to the nested structure; and
    compute a residual slice expression for representing a slice of the nested structure not included in the layout specification.

17. A method comprising:
inputting a nested structure;
providing a collocation specification comprising:
    expressions which define slices of the nested structure, the slices comprising subsets of fields within the nested structure; and
    a grouping of one or more of the slices for collocation at a storage layer;
computing an expression which defines a subset of fields not covered in the collocation specification;
preparing, in a data store, structures for storing at least portions of the nested structure;
creating slices from the nested structure;
storing the created slices in the data store;
enumerating at least one access plan, each access plan comprising at least one slice which is configured for retrieving an arbitrary query slice from the data store;
said enumerating comprising:
    defining at least one stored slice to be retrieved for answering a projection query;
    said defining comprising:
        constructing a tree, wherein the tree comprises paths specified in at least one layout expression and paths specified in the projection query; and
        for each path to retrieve, maintaining an availability set comprising a set of slice IDs; and
    providing a projection relative to at least one of the retrieved slices;
estimating a cost of each access plan;
choosing an access plan, from the at least one access plan, based on said estimating of cost; and
executing the chosen access plan, and reconstructing the nested structure from one or more slices retrieved by the chosen access plan, wherein the reconstructed nested structure comprises at least one field encompassed by the query slice associated with the chosen access plan.

* * * * *